(12) United States Patent
Nishizawa

(10) Patent No.: US 12,452,518 B2
(45) Date of Patent: Oct. 21, 2025

(54) ELECTRONIC APPARATUS, METHOD FOR CONTROLLING ELECTRONIC APPARATUS, AND NON-TRANSITORY COMPUTER READABLE MEDIUM

(71) Applicant: CANON KABUSHIKI KAISHA, Tokyo (JP)

(72) Inventor: Hideta Nishizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 17/970,634

(22) Filed: Oct. 21, 2022

(65) Prior Publication Data

US 2023/0039896 A1 Feb. 9, 2023

Related U.S. Application Data

(63) Continuation of application No. PCT/JP2021/015327, filed on Apr. 13, 2021.

(30) Foreign Application Priority Data

Apr. 30, 2020 (JP) ................................ 2020-080331

(51) Int. Cl.
*H04N 23/61* (2023.01)
*G06F 21/32* (2013.01)
*G06V 40/18* (2022.01)
*G06V 40/60* (2022.01)
*G06V 40/70* (2022.01)
(Continued)

(52) U.S. Cl.
CPC ........... *H04N 23/611* (2023.01); *G06F 21/32* (2013.01); *G06V 40/18* (2022.01); *G06V 40/60* (2022.01); *G06V 40/70* (2022.01); *H04N 5/77* (2013.01); *H04N 23/53* (2023.01); *H04N 23/56* (2023.01)

(58) Field of Classification Search
USPC ............................................................ 348/78
See application file for complete search history.

(56) References Cited

U.S. PATENT DOCUMENTS 10,769,465 B2 * 9/2020 Zhang .................... G06V 40/63
10,979,430 B1 * 4/2021 Hitchcock ............. H04L 63/102
(Continued)

FOREIGN PATENT DOCUMENTS

CN 104274151 A 1/2015
JP 05-91394 A 4/1993
(Continued)

OTHER PUBLICATIONS

International Search Report dated Jul. 13, 2021 of International Application No. PCT/JP2021/015327.
(Continued)

*Primary Examiner* — Nigar Chowdhury
(74) *Attorney, Agent, or Firm* — Cowan, Liebowitz & Latman, P.C.

(57) ABSTRACT

An electronic apparatus includes: control means for performing control to record, in recording means, characteristic data on a line-of-sight; authentication means for authenticating a user; and detection means for detecting, in a case where characteristic data on a line-of-sight of the authenticated user is recorded in the recording means, a line-of-sight of the user by using the recorded characteristic data on the line-of-sight.

17 Claims, 6 Drawing Sheets

(51) Int. Cl.
*H04N 5/77* (2006.01)
*H04N 23/53* (2023.01)
*H04N 23/56* (2023.01)
*H04N 23/611* (2023.01)

(56) References Cited

U.S. PATENT DOCUMENTS

| | | | | |
|---|---|---|---|---|
| 11,017,404 | B1* | 5/2021 | Chang | G06F 21/554 |
| 11,044,085 | B2* | 6/2021 | Funayama | H04L 9/3271 |
| 11,113,552 | B2* | 9/2021 | Ha | H04N 23/633 |
| 11,120,159 | B1* | 9/2021 | Ketharaju | G06F 21/50 |
| 2003/0220835 | A1* | 11/2003 | Barnes, Jr. | G06Q 10/02 |
| | | | | 379/93.12 |
| 2009/0225275 | A1* | 9/2009 | Horie | A61H 5/00 |
| | | | | 351/203 |
| 2014/0241593 | A1* | 8/2014 | Koseki | G06V 40/16 |
| | | | | 382/118 |
| 2014/0250523 | A1* | 9/2014 | Savvides | G06F 21/32 |
| | | | | 726/19 |
| 2015/0009313 | A1* | 1/2015 | Noda | A61B 5/117 |
| | | | | 348/78 |
| 2015/0033305 | A1* | 1/2015 | Shear | G06F 21/53 |
| | | | | 726/11 |
| 2016/0125221 | A1* | 5/2016 | Kim | G06T 7/0012 |
| | | | | 382/117 |
| 2017/0017842 | A1* | 1/2017 | Ma | G06V 40/18 |
| 2017/0070680 | A1* | 3/2017 | Kobayashi | H04N 23/63 |
| 2018/0012007 | A1* | 1/2018 | Kim | G06F 18/00 |
| 2018/0096119 | A1* | 4/2018 | Yun | A61B 5/024 |
| 2018/0276465 | A1 | 9/2018 | Lee et al. | |
| 2018/0276468 | A1* | 9/2018 | Lee | G06V 40/63 |
| 2018/0285544 | A1* | 10/2018 | Chang | G06V 40/172 |
| 2020/0250403 | A1* | 8/2020 | Xiao | G06V 40/168 |
| 2020/0311404 | A1* | 10/2020 | Derakhshani | G06V 40/1382 |
| 2020/0380149 | A1* | 12/2020 | Ramesh | H04L 9/0861 |
| 2021/0004588 | A1* | 1/2021 | Correa Bahnsen | G06V 40/197 |
| 2021/0042401 | A1* | 2/2021 | Nagai | G06T 7/521 |
| 2021/0080208 | A1* | 3/2021 | Wu | G08B 25/014 |
| 2021/0104108 | A1* | 4/2021 | Cartwright | G07C 9/00563 |
| 2021/0125185 | A1* | 4/2021 | Indermaur | G06Q 20/40145 |
| 2021/0240363 | A1* | 8/2021 | Tumblin | G06F 21/6218 |
| 2021/0359875 | A1* | 11/2021 | Hong | F25D 29/00 |
| 2022/0027647 | A1* | 1/2022 | Tsukada | G06V 40/40 |
| 2022/0308584 | A1* | 9/2022 | Suzuki | G08G 1/00 |
| 2024/0104554 | A1* | 3/2024 | Tibor | G06Q 20/3674 |

FOREIGN PATENT DOCUMENTS

| | | |
|---|---|---|
| JP | 08-504979 A | 5/1996 |
| JP | 2006-157154 A | 6/2006 |
| JP | 2007141002 A | 6/2007 |
| JP | 2014-211795 A | 11/2014 |
| JP | 2015-013031 A | 1/2015 |
| JP | 2019-008527 A | 1/2019 |
| WO | 2016088415 A1 | 6/2016 |

OTHER PUBLICATIONS

Jul. 2, 2024 Japanese Office Action, a copy of which is enclosed without an English Translation, that issued in Japanese Patent Application No. 0206315-01.

Dec. 19, 2024 Chinese Office Action, that issued in Chinese Patent Application No. 202180031934.X.

* cited by examiner

ELECTRONIC APPARATUS, METHOD FOR CONTROLLING ELECTRONIC APPARATUS, AND NON-TRANSITORY COMPUTER READABLE MEDIUM

CROSS-REFERENCE TO RELATED APPLICATIONS

This application is a Continuation of International Patent Application No. PCT/JP2021/015327, filed Apr. 13, 2021, which claims the benefit of Japanese Patent Application No. 2020-080331, filed Apr. 30, 2020, both of which are hereby incorporated by reference herein in their entirety.

BACKGROUND OF THE INVENTION

Field of the Invention

The present invention relates to an electronic apparatus, a method for controlling an electronic apparatus, and a non-transitory computer readable medium.

Background Art

For electronic apparatus, line-of-sight input technologies as technologies for receiving input of line-of-sights are known. PTL 1 discloses a video camera for detecting a viewpoint position (position that user views). For biometric authentication, a technology for specifying (authenticating) a user individual by an electronic apparatus is known. PTL 2 discloses a technology of iris authentication for specifying a user individual by using the iris.

In technologies of line-of-sight input, because the shifts of the radius of rotation of the eyeball and the line-of-sight during opening/closing of the pupil vary depending on users, line-of-sight characteristic data called calibration data, which is data for correcting the shifts, is necessary for each user. However, when an electronic apparatus is used by a plurality of persons, calibration data for the plurality of persons needs to be registered (acquired) in advance, and line-of-sight input is not accurately detected in some cases after a user using the electronic apparatus is changed.

Even when calibration data for a plurality of persons have been registered in advance, a user needs to select his/her registered content when using a function corresponding to line-of-sight input, which burdensome to the user. Unless a user remembers which of a plurality of pieces of registered calibration data is his/her own data, there is a burden that the user needs to acquire calibration data again.

CITATION LIST

Patent Literature

PTL 1 Japanese Patent Application Publication No. H05-091394
PTL 2 Japanese Translation of PCT Application No. H08-504979

SUMMARY OF THE INVENTION

It is therefore an object of the present disclosure of technology to reduce a cumbersome process when a plurality of persons use line-of-sight input.

A first aspect of the present invention is an electronic apparatus including at least one memory and at least one processor which function as: control means for performing control to record, in recording means, characteristic data on a line-of-sight of; authentication means for authenticating the user; and detection means for detecting, in a case where characteristic data on a line-of-sight of the authenticated user is recorded in the recording means, a line-of-sight of the user by using the recorded characteristic data on the line-of-sight.

A second aspect of the present invention is a method for controlling an electronic apparatus, the method including: a control step for performing control to record, in recording means, characteristic data on a line-of-sight of; an authentication step for authenticating a user; and a detection step for detecting, in a case where characteristic data on a line-of-sight of the authenticated user is recorded in the recording means, a line-of-sight of the user by using the recorded characteristic data on the line-of-sight.

Further features of the present invention will become apparent from the following description of exemplary embodiments with reference to the attached drawings.

DESCRIPTION OF THE EMBODIMENTS

Embodiments of the present invention are described in detail below with reference to the accompanying drawings.

Embodiment 1

(Configuration of Imaging Apparatus)

Figure 1:
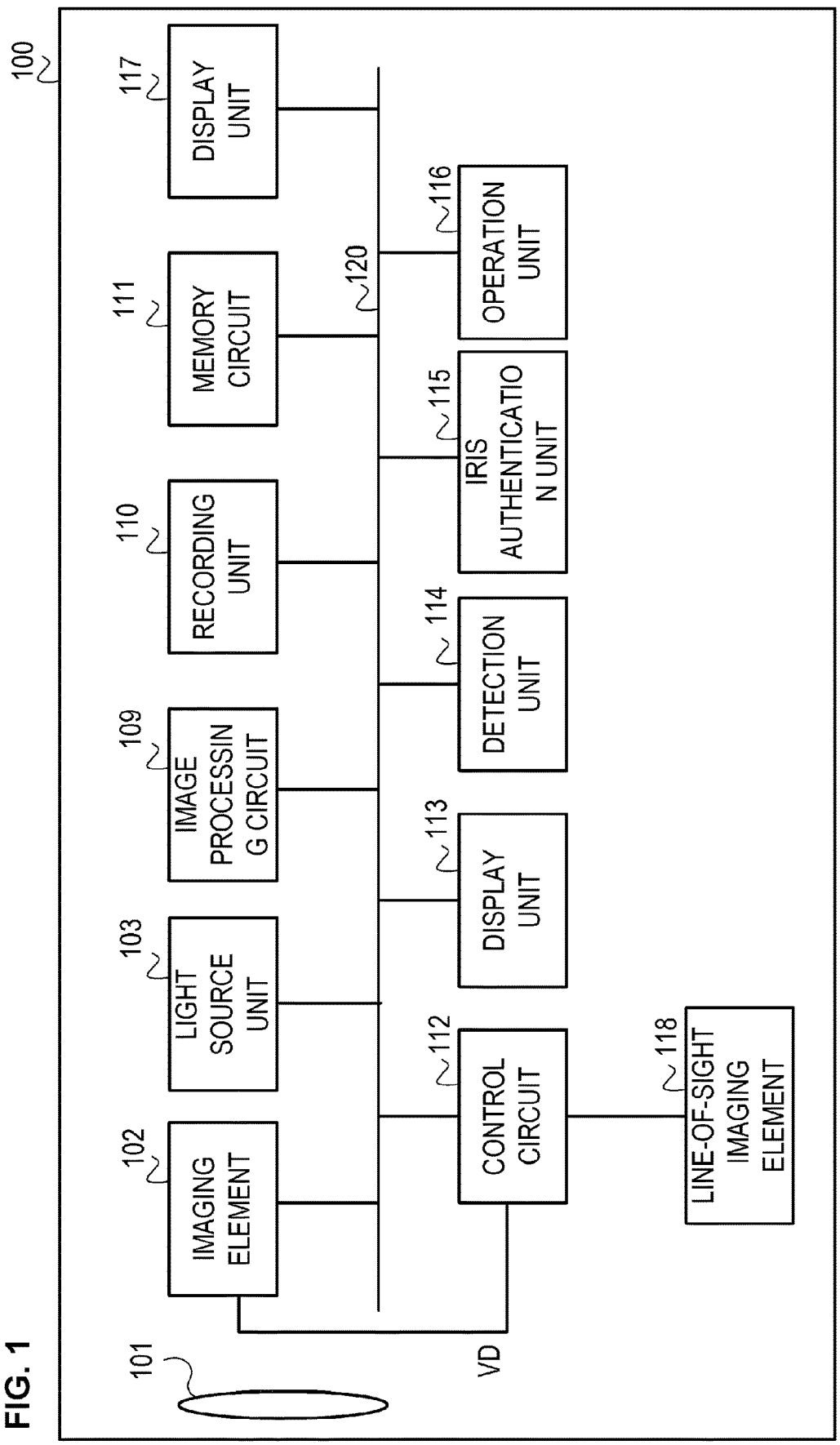
FIG. 1 is a configuration diagram of an imaging apparatus according to Embodiment 1.

Referring to FIG. 1, a configuration of an imaging apparatus 100 according to the present embodiment is described. FIG. 1 is a configuration diagram of the imaging apparatus 100 according to Embodiment 1. The imaging apparatus 100 is not limited to a camera, such as a digital camera, as long as line-of-sight input from a user can be received, and may be other electronic apparatus such as a smartphone and a personal computer.

The imaging apparatus 100 includes a lens unit 101, an imaging element 102, a light source unit 103, an image processing circuit 109, a recording unit 110, a memory circuit 111, a control circuit 112, a display unit 113, a detection unit 114, and an iris authentication unit 115. The imaging apparatus 100 further includes an operation unit 116, a display unit 117, line-of-sight imaging element 118, and a bus 120.

The lens unit 101 condenses incident light from a subject onto the imaging element 102. For example, the lens unit 101 includes a plurality of lenses and an aperture.

The imaging element 102 acquires an image (image data) in which a subject appears on the basis of light condensed by the lens unit 101. The light source unit 103 includes a light source for irradiating the subject with light.

The image processing circuit 109 (development processing unit) performs development processing, such as color matrix processing and gamma processing, on an image acquired from the imaging element 102. Note that, in these pieces of processing, the image processing circuit 109 records the image in the memory circuit 111 as necessary. The image processing circuit 109 outputs the processed image to the display unit 113, the display unit 117, and the recording unit 110.

The recording unit 110 records (stores) images and programs therein. The recording unit 110 records therein, for each user, iris data indicating characteristics of an iris and calibration data associated with the iris data. In the present embodiment, the calibration data is line-of-sight characteristic data used for correcting shift of the radius of rotation of the eyeball and line-of-sights during opening/closing of the pupil for each user and specifying a position of the viewpoint (viewpoint position). In other words, the calibration data is information that associates the direction of the eye of a user and the position (viewpoint position) that the user actually views.

The control circuit 112 executes control of a part of image processing of the image processing circuit 109 and driving of the imaging element 102. The control circuit 112 executes the control of display of the display unit 113 and the display unit 117, the control of reception of instructions from the operation unit 116, and the control of passing of data to the memory circuit 111 and the recording unit 110. Without being limited to the configuration in which the control circuit 112 controls the imaging element 102 and the image processing circuit 109, the imaging element 102 or the image processing circuit 109 itself may include a control unit.

The display unit 113 and the display unit 117 display processed images. In the present embodiment, the display unit 117 is an electrical viewfinder (EVF). A user can visually recognize an image displayed on the display unit 117 inside the imaging apparatus 100 through eyepiece finder (not shown). In other words, the display unit 113 is a display unit visually recognized by a user when the eye of the user does not contact (is not close to) the eyepiece finder. The display unit 117 is a display unit visually recognized by a user when the eye of the user contacts the eyepiece finder (when user looks in eyepiece finder).

The detection unit 114 detects a line-of-sight (viewpoint position; viewing position; line-of-sight position) of a user on the basis of an image in which the eye (motion of eye) of the user appears. In the present embodiment, the line-of-sight (viewpoint position) of the user is detected in a state in which the user looks in the display unit 117 through the eyepiece finder. The detection unit 114 acquires calibration data for each user. Note that, in the present embodiment, a user can operate each functional unit in the imaging apparatus 100 depending on a viewpoint position. For example, when a viewpoint position on the display unit 117 is detected, the imaging apparatus 100 can execute autofocus (AF) for the detected position. Note that the detection unit 114 detects a viewpoint position of a user on the basis of an image in which the eye of the user appears that is acquired from the line-of-sight imaging element 118.

The iris authentication unit 115 acquires iris data, which is information unique to a user (biometric data), and authenticates the user (performs iris authentication) to associate calibration data and iris data (user individual) with each other.

The operation unit 116 generates an operation signal corresponding to user operation. The operation unit 116 includes a touch panel, a dial, a 4-direction key, a shutter button, a power switch, a menu button, a play button, and the like.

The line-of-sight imaging element 118 acquires an image in which the eye of a user appears, which is an image used for detecting a line-of-sight of the user. In the present embodiment, the line-of-sight imaging element 118 includes IR pixels having sensitivity to infrared light. The bus 120 is a common path used for the functional units in the imaging apparatus 100 to exchange data.

(Flow of Acquiring and Recording Calibration Data)

Figure 2:
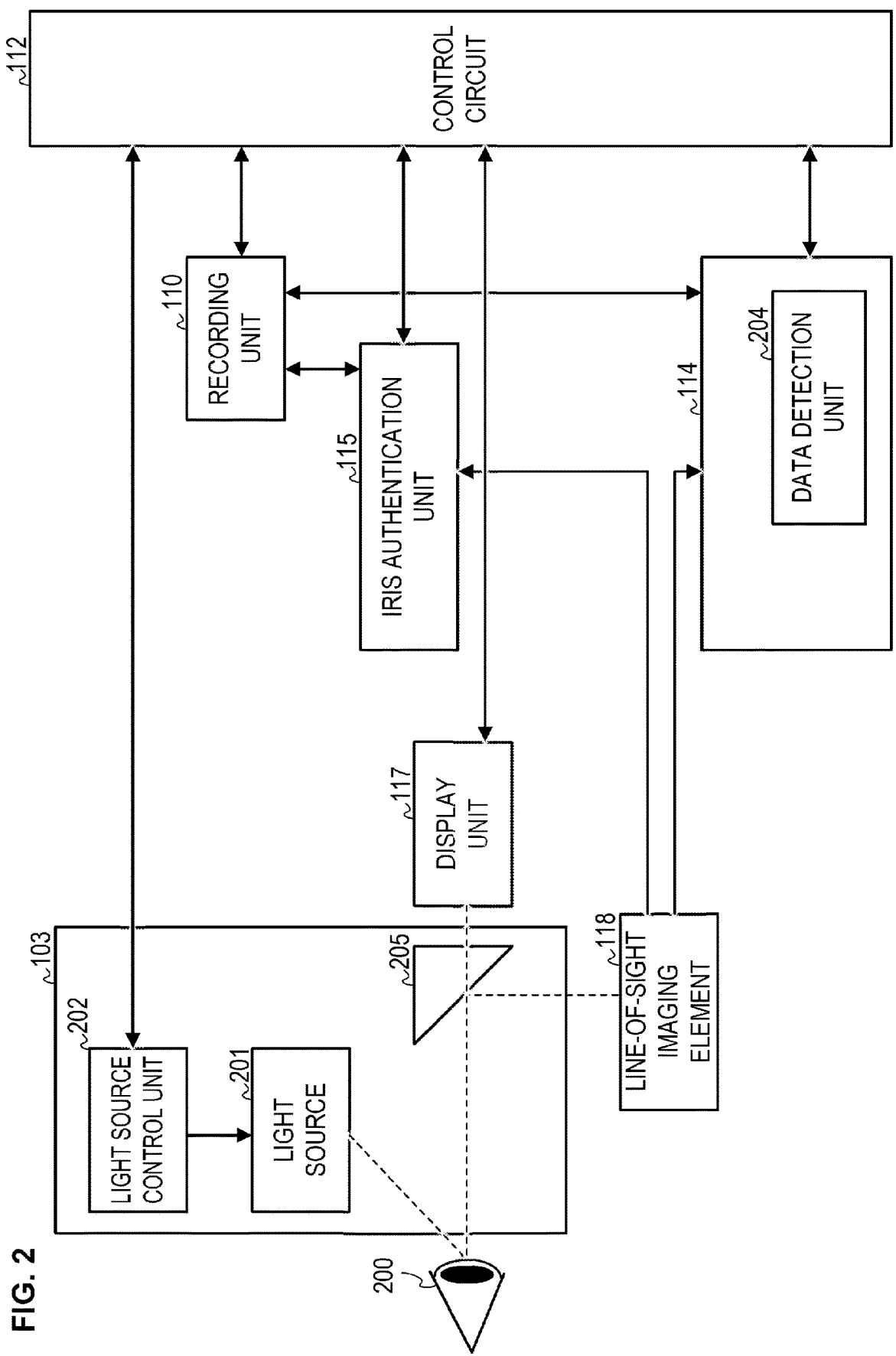
FIG. 2 is a diagram for describing recording of calibration data, etc. according to Embodiment 1.

Referring to FIG. 2, the flow of processing from when the imaging apparatus 100 is started to when calibration data is acquired and the calibration data is recorded in the recording unit 110 is described. FIG. 2 illustrates functional units for executing processing related to the flow of acquiring and recording calibration data in the imaging apparatus 100. Note that the light source unit 103 includes a light source 201, a light source control unit 202, and a prism 205. The light source 201 applies infrared light (IR light). The light source control unit 202 controls the light source 201 to irradiate an eye 200 of a user with light. The prism 205 is disposed in front of the display unit 117, and refracts light applied from the eye 200 of the user so as to enter the line-of-sight imaging element 118.

First, the light source control unit 202 controls the light source 201 such that the eye 200 of the user is irradiated with infrared light from the light source 201. Then, the infrared light reflected by the eye 200 of the user is refracted by the prism 205 to enter the line-of-sight imaging element 118. The line-of-sight imaging element 118 has sensitivity to infrared light, and hence can acquire an image in which the eye 200 of the user appears.

When calibration data for the user authenticated by the iris authentication unit 115 is not recorded in the recording unit 110, the data detection unit 204 included in the detection unit 114 acquires calibration data in accordance with the image of the eye 200 acquired by the line-of-sight imaging element 118. Note that, when calibration data has been acquired in advance, the detection unit 114 can detect a position (viewpoint position) that the user views on the display unit 117 in accordance with the image of the eye 200 of the user acquired by the line-of-sight imaging element 118.

At the time of start of the imaging apparatus 100, the iris authentication unit 115 acquires iris data on the basis of an image from the line-of-sight imaging element 118. A pattern of the iris part varies among persons, and hence an individual can be specified by treating information obtained by quantifying the characteristic amount of the pattern as iris data. The iris authentication unit 115 records iris data and calibration data in the recording unit 110 in relation to (in association with) each other. Note that, when calibration data to be associated with iris data is not recorded in the recording unit 110, the data detection unit 204 acquires calibration data (executes calibration) as described above. Note that the iris authentication unit 115 may detect an iris pattern when an image is acquired from the line-of-sight imaging element 118 or when contact of eye (approach of eye) indicating that a user looks in an EVF as the display unit 117 is detected by an eyepiece detection unit (not shown), without being limited to the timing of the start of the imaging apparatus. Note that the eye-contact detection can be performed, for example, on the basis of a change in light amount of infrared light reflected by an object that is received by an eyepiece detection unit when the eyepiece detection unit irradiates the object with infrared rays.

(Flow of Reading Calibration Data)

Figure 3:
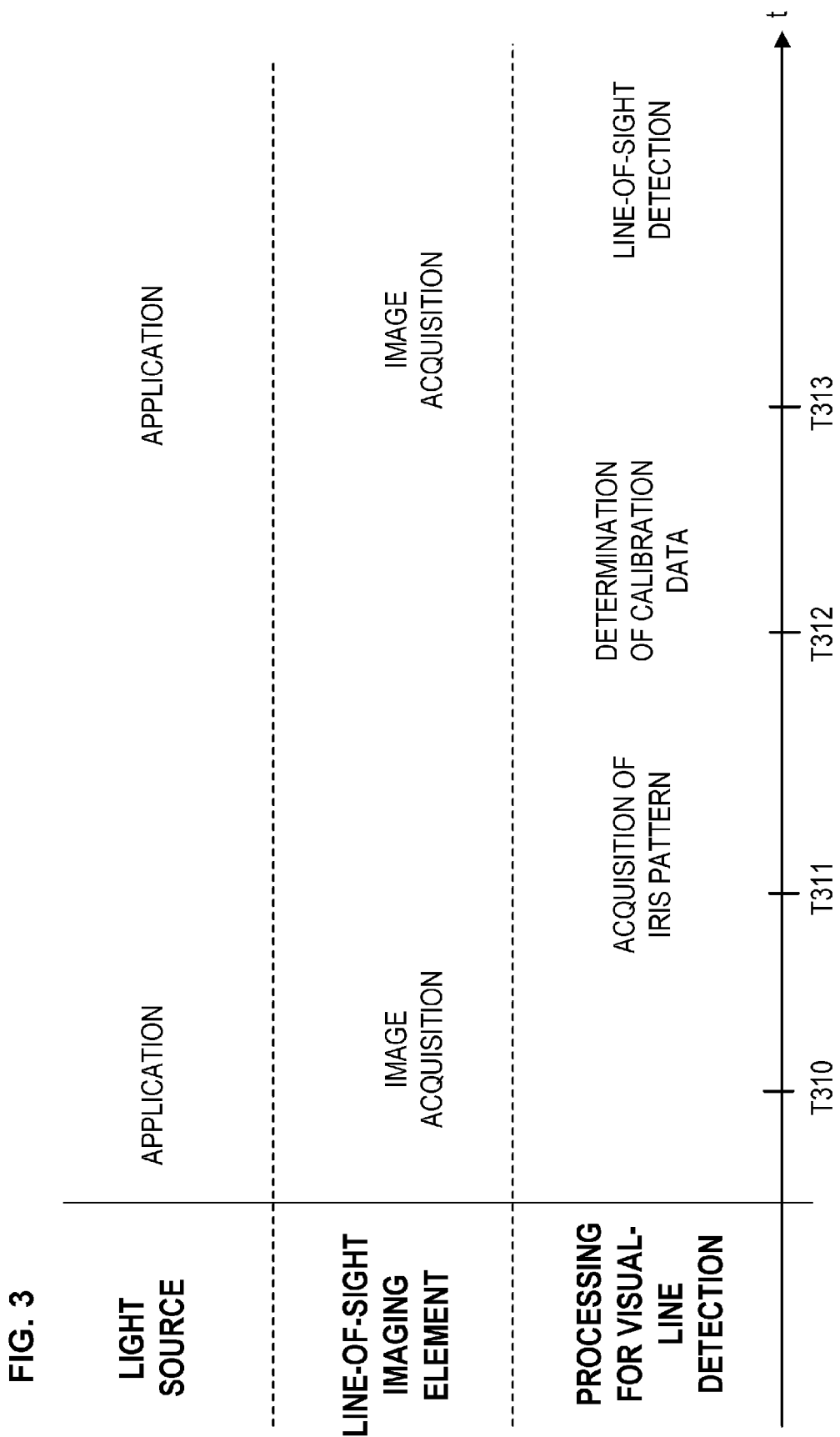
FIG. 3 is a diagram for describing reading of calibration data according to Embodiment 1.

FIG. 3 is a diagram illustrating a sequence of reading of calibration data with time (timings T310 to T313). FIG. 3 illustrates processing for line-of-sight detection by the iris authentication unit 115 and the detection unit 114 together with the processing by the light source 201 and the line-of-sight imaging element 118.

At the timing T310, the light source 201 irradiates (normally irradiates) the eye of the user with light, and the line-of-sight imaging element 118 acquires an image of the eye of the user. Note that, when the light amount is not sufficient in the normal application (application for line-of-sight detection) in the detection of the iris pattern, the light source 201 may increase the light amount of output of light to be applied. In other words, light having light amounts different between iris authentication and line-of-sight detection may be applied from the light source 201.

At the timing T311, the iris authentication unit 115 acquires (extracts) an iris pattern from the acquired image of the eye.

At the timing T312, when iris data that matches the iris pattern extracted in the recording unit 110 is recorded in the recording unit 110, the control circuit 112 acquires calibration data that has been recorded in the recording unit 110 in association with the iris data. The control circuit 112 sets (determines) the acquired calibration data as data used to detect a line-of-sight.

After the timing T313, on the basis of the set calibration data, the detection unit 114 acquires a viewpoint position of the user from the image acquired for line-of-sight detection (detects line-of-sight of user).

(Processing for Setting Calibration Data)

Figure 4:
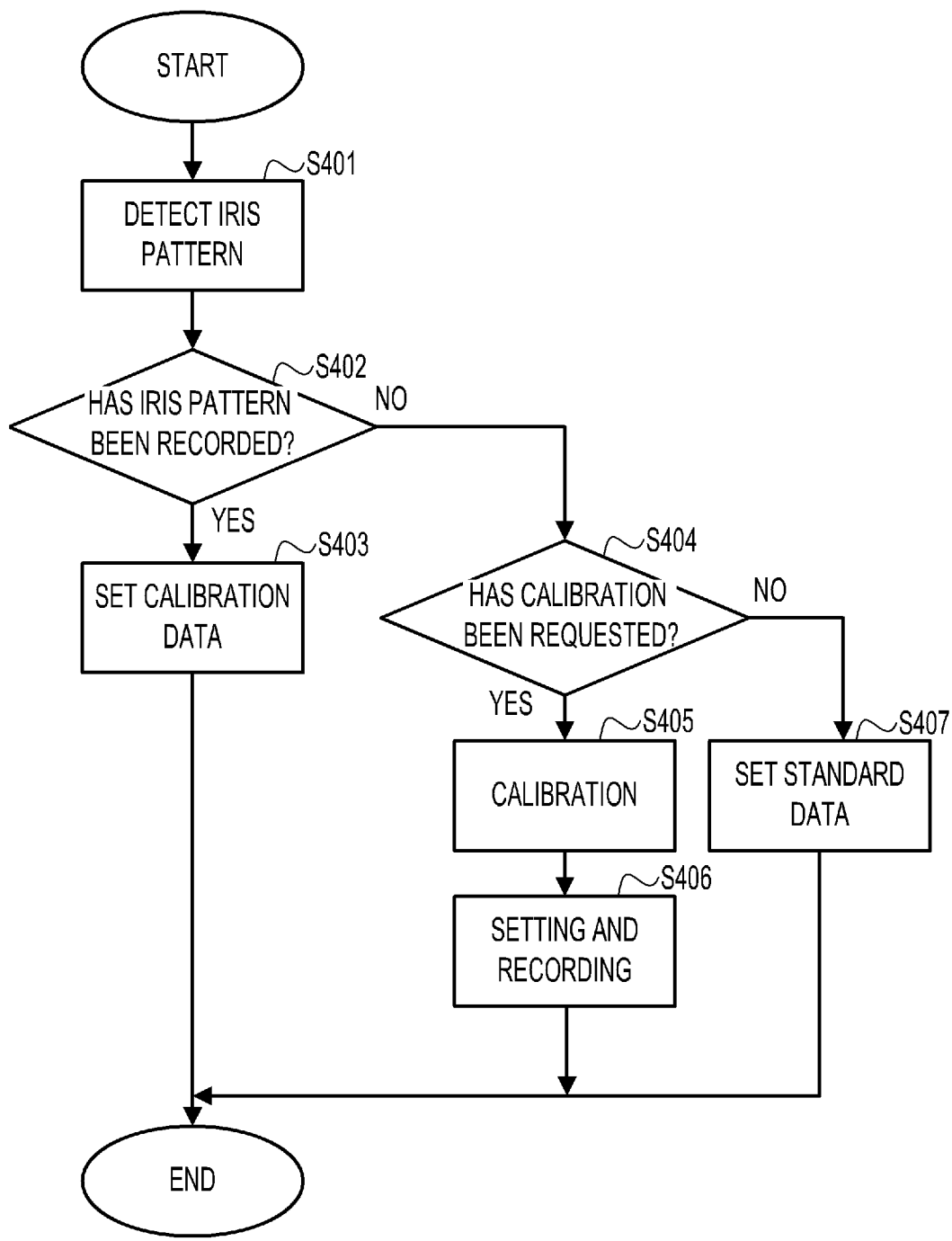
FIG. 4 is a flowchart of setting of calibration data according to Embodiment 1.

Referring to FIG. 4, processing for setting calibration data as data used for line-of-sight detection is described below. FIG. 4 is a flowchart illustrating setting processing for calibration data. The processing in this flowchart starts when the power switch is turned on and the imaging apparatus 100 starts. Note that the processing in this flowchart is implemented when the control circuit 112 reads and executes a program stored in the recording unit 110 (storage medium).

In S401, the control circuit 112 controls the iris authentication unit 115 to detect an iris pattern of a user.

In S402, the control circuit 112 determines whether iris data (iris pattern data) that matches the iris pattern detected in S401 is recorded in the recording unit 110. When an iris pattern that matches the iris pattern detected in S401 is recorded, the flow proceeds to S403. Otherwise, the flow proceeds to S404. In other words, in S402, a user is specified by an iris pattern (iris authentication), and it is determined whether the user executed calibration in the past and recorded calibration data in the recording unit 110.

In S403, the control circuit 112 sets calibration data that is recorded in the recording unit 110 in association with the detected iris pattern as data used to detect a line-of-sight. In other words, in the present embodiment, in S402 and S403, the control circuit 112 executes the iris authentication and sets calibration data that recorded in the recording unit 110 in association with the iris-authenticated user as data used for line-of-sight detection.

In S404, the control circuit 112 displays a selection screen for selecting whether to perform calibration on the display unit 117. After that, the control circuit 112 determines whether a user who has checked the selection screen has requested (instructed) calibration. When the user requests calibration, the flow proceeds to S405. Otherwise, the flow proceeds to S407. Note that, without inquiring of the user whether to perform calibration, the flow may proceed to S405 without exception, or proceed to S407 without exception.

In S405, the control circuit 112 controls the detection unit 114 (data detection unit 204) to newly acquire calibration data (to execute calibration).

In S406, the control circuit 112 sets (reflects) the calibration data acquired in S405 as data used to detect a line-of-sight. The control circuit 112 records (saves) the iris data acquired in S401 and the calibration data acquired in S405 in the recording unit 110 in association with each other. In this manner, a user can use the calibration data acquired in S405 from the next time.

In S407, the control circuit 112 sets standard data, which is general calibration data set in advance, as data used for line-of-sight detection. The standard data may be average data of calibration data for general persons (plurality of persons). Note that the standard data may be set at the time of shipping of the imaging apparatus 100 from the factory, or may be set by a user in advance. A plurality of pieces of standard data prepared depending on the sex, age, race, and height may be recorded in the recording unit 110 in advance, and in S407, a user may select data used for line-of-sight detection from among the plurality of pieces of standard data.

As described above, in Embodiment 1, when the imaging apparatus executes iris authentication (personal authentication) and calibration data associated with an iris-authenticated user is recorded in the recording unit, the imaging apparatus uses the calibration data for the detection of the line-of-sight of the user. In other words, a user who has used the imaging apparatus once is specified by acquiring iris data at the time of the start of the imaging apparatus, and hence calibration data on the user recorded in the imaging apparatus can be smoothly used. Even for a user who has never used the imaging apparatus, the user and calibration data can be easily recorded (registered) in association with each other by iris data acquired at the time of start of the imaging apparatus. Thus, even when a plurality of persons use the imaging apparatus, the function corresponding to line-of-sight input can be smoothly used.

Embodiment 2

In Embodiment 1, the light source applies infrared light for line-of-sight detection and iris data acquisition, but in Embodiment 2, infrared light is used for line-of-sight detection and visible light (RGB) is used for iris data acquisition. Note that a configuration of an imaging apparatus 100 according to Embodiment 2 is the same as the configuration of the imaging apparatus 100 according to Embodiment 1 as illustrated in FIG. 1 and FIG. 2. In the following, only differences from Embodiment 1 are described, and descriptions of the same parts are omitted. Note that visible light is light in wavelengths which is visible to the eye of human, and is, for example, light having a wavelength from 0.3 μm to 0.7 μm. Infrared light is light whose wavelength is longer than that of red of visible light and which is invisible to the eye of human, and is, for example, light having a wavelength from 0.7 μm to 1 mm.

In the present embodiment, the line-of-sight imaging element 118 includes RGB pixels having sensitivity to visible light (RGB) in addition to IR pixels having sensitivity to infrared light. In the present embodiment, the display unit 117 operates also as a light source for visible light. As specific processing, the line-of-sight imaging element 118 receives reflected light of infrared light from the light source 201 by the IR pixels, and outputs the resultant to the detection unit 114 as an image. The line-of-sight imaging element 118 receives reflected light of visible light from the display unit 117, which is an EVF, by the RGB pixels, and outputs the resultant to the iris authentication unit 115 as an image.

Figure 5:
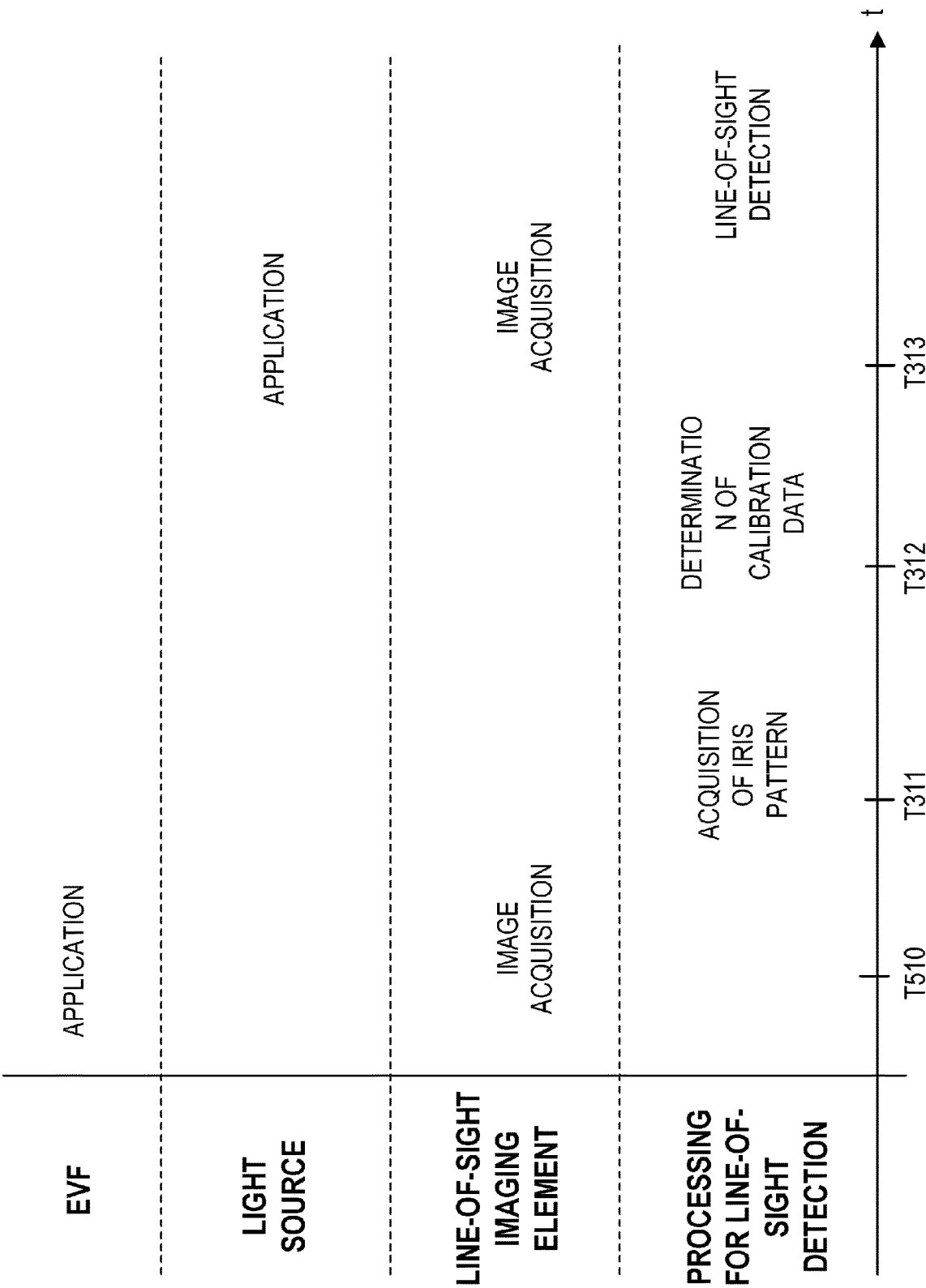
FIG. 5 is a diagram for describing reading of calibration data according to Embodiment 2.

Referring to FIG. 5, reading of calibration data is described below. FIG. 5 is a diagram illustrating a sequence of reading of calibration data in Embodiment 2. In the present embodiment, processing at timing T510 is executed instead of the processing at the timing T310 in the sequence illustrated in FIG. 3 according to Embodiment 1. In the present embodiment, at the timing T510, the display unit 117 applies visible light, and acquires reflected light of the visible light at the eye of the user, so that the line-of-sight imaging element 118 acquires an RGB image as an image of the eye of the user. Processing after the timing T311 is the same as the processing according to Embodiment 1.

Note that, in the present embodiment, the imaging element for line-of-sight detection acquires both an image for line-of-sight detection and an image for iris authentication. However, the configuration is not limited thereto. A first imaging element may acquire an image for line-of-sight detection (receive infrared light), and a second imaging element different from the first imaging element may acquire an image for iris authentication (receive visible light). In the present embodiment, the configuration in which two light sources, that is, a light source for line-of-sight detection and a light source for iris authentication, are provided has been described. However, line-of-sight detection and iris authentication may be performed by a single light source. A light source capable of emitting both infrared light and visible light may be employed such that light is applied while application timing is switched between iris authentication and line-of-sight detection.

As described above, in Embodiment 2, light having a wavelength different from that of light for detecting a line-of-sight is used to acquire iris data. Using different light beams for imaging can facilitate the change in resolution and exposure conditions during imaging between line-of-sight detection and iris authentication, and hence optimal conditions depending on usages can be set. It becomes easier to separate the functional unit for detecting a line-of-sight and the functional unit for performing iris authentication, and hence the present embodiment can be applied to various apparatus.

Embodiment 3

In Embodiment 3, the imaging apparatus 100 specifies a user (personal authentication; identification) by fingerprint authentication instead of iris authentication. In the following, descriptions of the same parts as in Embodiment 1 are omitted, and only differences are described in detail.

Figure 6:
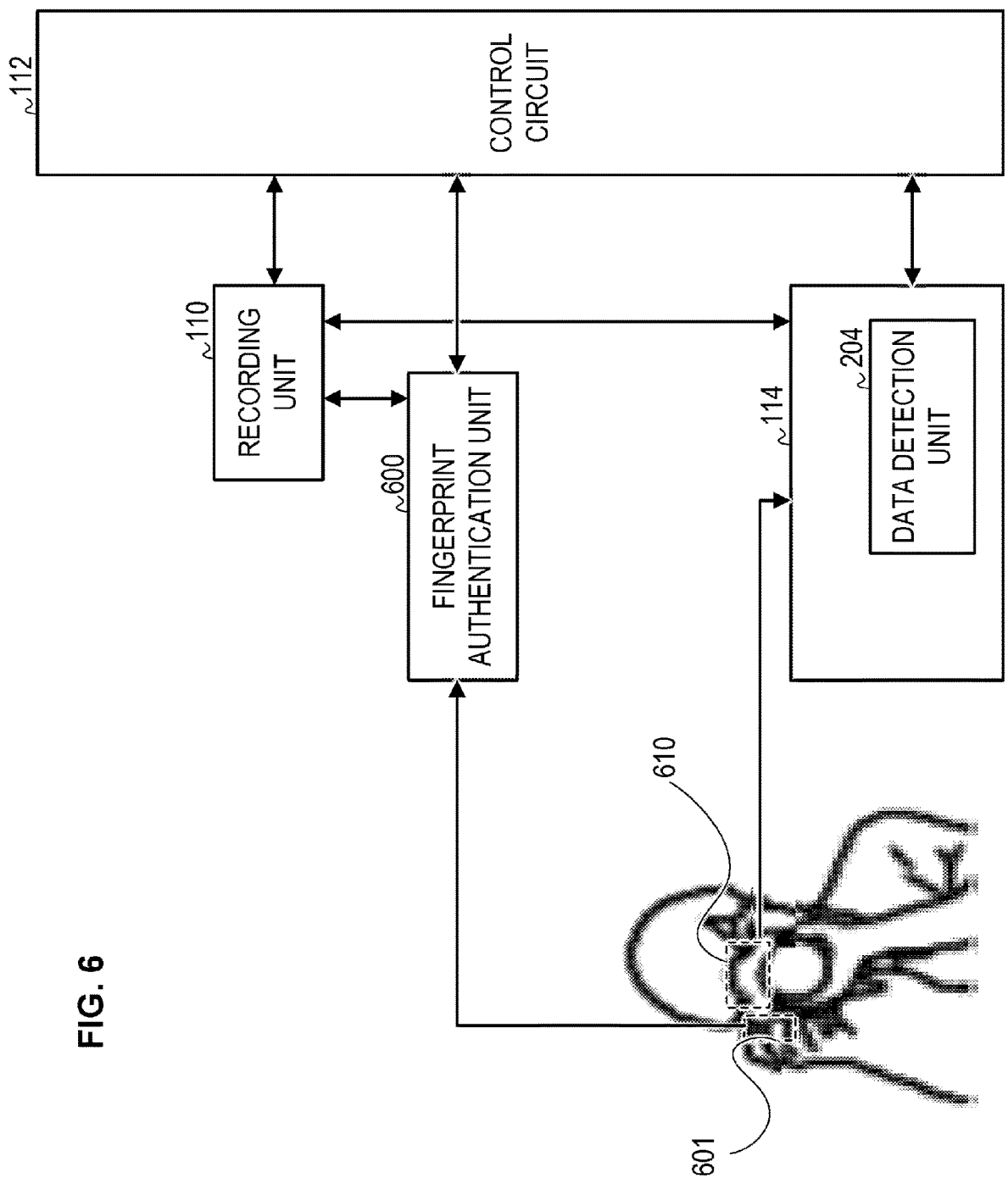
FIG. 6 is a diagram for describing recording of calibration data, etc. according to Embodiment 3.

The imaging apparatus 100 according to the present embodiment includes a fingerprint authentication unit 600 instead of the iris authentication unit 115 in the configuration of the imaging apparatus 100 according to Embodiment 1. Note that, in FIG. 6, the light source unit 103, the line-of-sight imaging element 118, and the display unit 117 illustrated in FIG. 2 are collectively illustrated as a line-of-sight detection block 610.

Instead of the processing where the iris authentication unit 115 performs iris authentication (personal authentication) by using an image taken by the line-of-sight imaging element 118, the fingerprint detection unit 601 detects a fingerprint pattern of a user and the fingerprint authentication unit 600 acquires fingerprint data to perform fingerprint authentication. The recording unit 110 records fingerprint data and calibration data therein in association with each other.

In other words, in the present embodiment, at the time of start of the imaging apparatus 100, the control circuit 112 controls the fingerprint detection unit 601 to detect a fingerprint pattern of a user, and controls the fingerprint authentication unit 600 to acquire fingerprint data. Then, when fingerprint data that matches the acquired fingerprint data is recorded in the recording unit 110, the control circuit 112 sets calibration data that is recorded in association with the acquired fingerprint data as data used for line-of-sight detection. Through such processing, the same effect as in Embodiment 1 can be obtained even when a fingerprint is used to perform personal authentication.

Note that, in the present embodiment, fingerprint authentication may be mounted to other electronic apparatus and personal computers that do not have the iris authentication function, such as smartphones, so that calibration data and fingerprint data are associated with each other.

Freely selected personal authentication may be used instead of iris authentication and fingerprint authentication. For example, face authentication may be performed by detecting the face of a user and acquiring face data. Personal authentication may be performed by biometric authentication such as a vein pattern. Any authentication method may be used as long as data for authentication (biometric data) and calibration data can be associated with each other.

As described above, in the present embodiment, an example where a user is specified by personal authentication other than iris authentication and calibration data corresponding to the user is read has been described. In this manner, calibration data can be associated with a user without depending on specific personal authentication. For example, in the case of the imaging apparatus according to Embodiment 1, iris authentication cannot be performed unless the eye of a user contacts (is close to) an eyepiece finder, but fingerprint authentication (personal authentication) can be performed when the finger of a user grips a grip. In this manner, by changing the method for personal authentication, an effect that the range of acquisition timing can be enlarged can be obtained.

According to the present invention, a cumbersome process when a plurality of persons use line-of-sight input can be reduced.

While the present invention has been described in detail on the basis of the preferred embodiments, the present invention is not limited to the specific embodiments, and various modes within the range not departing from the gist of the invention are also included in the present invention. Furthermore, each of the above-mentioned embodiments is merely illustrative of one embodiment of the present invention, and the embodiments can be combined as appropriate.

For example, face authentication may be used when the brightness of ambient light around the imaging apparatus 100 is equal to or more than predetermined brightness, and iris authentication (or fingerprint authentication) may be performed when the brightness of ambient light around the imaging apparatus 100 is less than (darker than) predetermined brightness. Note that, when the brightness of ambient light around the imaging apparatus 100 is less than predetermined brightness, a user may be notified by a notification unit such that the user makes the eye close to the eyepiece finder. In this manner, the use of a plurality of kinds of authentication enables users to be authenticated in many cases.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above-mentioned embodiments, and can be variously changed and modified without departing from the spirit and scope of the present invention. Thus, the following claims are attached in order to clarify the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus, comprising
an eyepiece finder, and
at least one memory and at least one processor which function as:
a control unit configured to perform control to record, in a recording unit, calibration data for correcting a shift of a line-of-sight;
an imaging unit configured to acquire a first image of an eye of a user by receiving first light applied from a light source and reflected by the eye of the user;
a notification unit configured to notify the user to move the eye closer to the eyepiece finder in a case where brightness of ambient light around the electronic apparatus is darker than predetermined brightness;
an authentication unit configured to authenticate the user by detecting an iris pattern of the user based on the first image in a case where the eye of the user is close to the eyepiece finder; and
a detection unit configured to detect the line-of-sight of the user, after authenticating the user by the authentication unit, by using the calibration data which is associated with the user specified as a result of the authentication and is recorded by the recording unit.

2. The electronic apparatus according to claim 1, wherein the imaging unit acquires a second image of the eye of the user by receiving second light applied from a light source and reflected by the eye of the user, and
the detection unit detects the line-of-sight of the user on the basis of the second image.

3. The electronic apparatus according to claim 2, further comprising:
a first light source configured to irradiate the eye of the user with the first light; and
a second light source configured to irradiate the eye of the user with the second light.

4. The electronic apparatus according to claim 2, wherein the first light source is an electrical viewfinder (EVF), and the first light is visible light.

5. The electronic apparatus according to claim 3, wherein the first light and the second light have different wavelengths.

6. The electronic apparatus according to claim 1, wherein the first light and the second light have different light amounts.

7. The electronic apparatus according to claim 3, wherein light amounts of the first light is larger than light amounts of the second light.

8. The electronic apparatus according to claim 3, wherein the second light is infrared light.

9. The electronic apparatus according to claim 1, wherein in a case where the calibration data for correcting a shift of the line-of-sight of the authenticated user is not recorded in the recording unit, the detection unit makes the user to select whether or not to register the calibration data for correcting a shift of the line-of-sight.

10. The electronic apparatus according to claim 1 wherein the authentication unit authenticates the user by detecting a pattern of a face of the user in a case where brightness of ambient light around the electronic apparatus is equal to or brighter than the predetermined brightness.

11. The electronic apparatus according to claim 1 wherein in a case where the calibration data for correcting a shift of the line-of-sight of the authenticated user is recorded in the recording unit, the detection unit detects the line-of-sight of the user by using the recorded calibration data,
in a case where the calibration data for correcting a shift of the line-of-sight of the authenticated user is not recorded in the recording unit, the detection unit newly acquires calibration data for correcting a shift of a line-of-sight of the user, and detects the line-of-sight of the user by using the newly acquired calibration data, and
the control unit performs control to record, in the recording unit, the calibration data for correcting a shift of the line-of-sight newly acquired by the detection unit.

12. The electronic apparatus according to claim 1, wherein, in a case where the calibration data for correcting a shift of the line-of-sight of the authenticated user is not recorded in the recording unit, the detection unit detects the line-of-sight of the user by using calibration data for correcting a shift of a line-of-sight set in advance.

13. The electronic apparatus according to claim 1, wherein the authentication unit authenticates the user at a time of start of the electronic apparatus.

14. The electronic apparatus according to claim 1, wherein in a case where the calibration data for correcting a shift of the line-of-sight of an authenticated user is not recorded in the recording unit, the control unit performs control to set average calibration data from a plurality of persons as the calibration data for the authenticated user.

15. The electronic apparatus according to claim 1, wherein if iris data of a user matches an iris pattern in the recording unit, the calibration data associated with the user is acquired from the recording unit to correct the shift of line-of-sight of the user.

16. A method for controlling an electronic apparatus, the method comprising:
- a control step for performing control to record, in a recording unit, calibration data for correcting a shift of a line-of-sight;
- an authentication step for authenticating a user by detecting an iris pattern of the user based on a first image of an eye of the user, the first image being acquired by receiving first light applied from a light source and reflected by the eye of the user;
- a notification step for notifying the user to move the eye closer to an eyepiece finder in a case where brightness of ambient light around the electronic apparatus is darker than predetermined brightness; and
- a detection step for detecting the line-of-sight of the user, after authenticating the user in the authentication step, by using the calibration data which is associated with the user specified as a result of the authentication.

17. A non-transitory computer-readable storage medium storing a computer program which causes a computer to execute a method for controlling an electronic apparatus, the method comprising:
- a control step for performing control to record, in a recording unit, calibration data for correcting a shift of a line-of-sight;
- an authentication step for authenticating a user by detecting an iris pattern of the user based on a first image of an eye of the user, the first image being acquired by receiving first light applied from a light source and reflected by the eye of the user;
- a notification step for notifying the user to move the eye closer to an eyepiece finder in a case where brightness of ambient light around the electronic apparatus is darker than predetermined brightness; and
- a detection step for detecting the line-of-sight of the user, after authenticating the user in the authentication step, by using the calibration data which is associated with the user specified as a result of the authentication and is recorded by the recording unit.

* * * * *